(12) United States Patent
Ninomiya et al.

(10) Patent No.: US 12,155,090 B2
(45) Date of Patent: Nov. 26, 2024

(54) PARTITION MEMBER AND BATTERY PACK

(71) Applicant: MITSUBISHI CHEMICAL CORPORATION, Tokyo (JP)

(72) Inventors: Naoya Ninomiya, Tokyo (JP); Naoto Maru, Tokyo (JP); Tatsuhiko Honda, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 724 days.

(21) Appl. No.: 17/481,440

(22) Filed: Sep. 22, 2021

(65) Prior Publication Data

US 2022/0006158 A1 Jan. 6, 2022

Related U.S. Application Data

(63) Continuation of application No. PCT/JP2020/013665, filed on Mar. 26, 2020.

(30) Foreign Application Priority Data

Mar. 29, 2019 (JP) .................................. 2019-066960

(51) Int. Cl.
*H01M 50/491* (2021.01)
*H01M 50/191* (2021.01)
(Continued)

(52) U.S. Cl.
CPC ....... *H01M 50/491* (2021.01); *H01M 50/191* (2021.01); *H01M 50/197* (2021.01);
(Continued)

(58) Field of Classification Search
CPC ............. H01M 50/183; H01M 50/191; H01M 50/193; H01M 50/195; H01M 50/197;
(Continued)

(56) References Cited

U.S. PATENT DOCUMENTS

2004/0224190 A1 11/2004 Sasahara et al.
2012/0148895 A1 6/2012 Fujikawa et al.
(Continued)

FOREIGN PATENT DOCUMENTS

JP   2012048905 A   3/2012
JP   2013131428 A   7/2013
(Continued)

OTHER PUBLICATIONS

Chinese Search Report issued Oct. 25, 2023 in Chinese Patent Application No. 202080023911.X (with machine English translation), 4 pages.
(Continued)

*Primary Examiner* — Christopher P Domone
(74) *Attorney, Agent, or Firm* — Element IP, PLC (57) ABSTRACT

A partition member has a thickness direction and a surface direction orthogonal to the thickness direction and partitions between unit batteries constituting an assembled battery in the thickness direction. The partition member comprises an exterior body including at least sealant resin layers and base material layers, and a liquid accommodated in the exterior body. The exterior body has a sealing portion in which the sealant resin layers are overlapped and joined in a region including an outer edge thereof. A width W (mm) of the sealing portion, a circumferential length L (mm) of the sealing portion, an average interval D (mm) between the two base material layers facing each other in the sealing portion, and a weight A (g) of the liquid satisfy Equation 1 below $$(L \times D)/(W \times A) \leq 10.0 \qquad \text{Equation 1.}$$

12 Claims, 8 Drawing Sheets

(51) Int. Cl.
| | |
|---|---|
| *H01M 50/197* | (2021.01) |
| *H01M 50/204* | (2021.01) |
| *H01M 50/291* | (2021.01) |
| *H01M 50/293* | (2021.01) |
| *H01M 50/431* | (2021.01) |
| *H01M 50/44* | (2021.01) |
| *H01M 50/443* | (2021.01) |

(52) U.S. Cl.
CPC ....... *H01M 50/204* (2021.01); *H01M 50/291* (2021.01); *H01M 50/293* (2021.01); *H01M 50/431* (2021.01); *H01M 50/44* (2021.01); *H01M 50/443* (2021.01)

(58) Field of Classification Search
CPC ............. H01M 50/204; H01M 50/289; H01M 50/291; H01M 50/293; H01M 50/431
See application file for complete search history.

(56) References Cited

U.S. PATENT DOCUMENTS

2019/0181515 A1* 6/2019 Kuboki ............. H01M 10/6567
2020/0058972 A1 2/2020 Kawai et al.

FOREIGN PATENT DOCUMENTS

| JP | 2013218991 A | 10/2013 |
|---|---|---|
| WO | WO-2012032697 A1 | 3/2012 |
| WO | WO-2018169044 A1 | 9/2018 |

OTHER PUBLICATIONS

English translation of International Preliminary Report on Patentability and Written Opinion issued Oct. 14, 2021 in PCT/JP2020/013665, 6 pages.

International Search Report issued Jun. 9, 2020 in PCT/JP2020/013665, (with English translation), 4 pages.

"D-EL40H datasheet", Dai Nippon Printing, XP055910862, Retrieved from the Internet: URL: https://wenku.baidu.com/view/7087bed1ce2f0066f533228b.html [retrieved on Apr. 8, 2022], Feb. 20, 2013, 1 page.

Extended European Search Report issued May 11, 2022 in Patent Application No. 20783272.6, 10 pages.

Office Action issued Dec. 30, 2022 in corresponding Indian Patent Application No. 202147047650, 7 pages.

Combined Taiwanese Office Action and Search Report issued Jan. 3, 2024, in corresponding Taiwanese Patent Application No. 109110625 (with machine English translation), 13 pages.

\* cited by examiner

PARTITION MEMBER AND BATTERY PACK

CROSS-REFERENCE TO RELATED APPLICATION

This application is a continuation application of International Application PCT/JP2020/013665 filed on Mar. 26, 2020 and designated the U.S., and this application is based upon and claims the benefit of priority of the prior Japanese Patent Application No. 2019-066960, filed on Mar. 29, 2019, the entire contents of which are incorporated herein by reference.

BACKGROUND

1. Field

The present invention relates to a partition member and an assembled battery (battery pack).

2. Description of the Related Art

In recent years, regarding secondary batteries whose use as power sources for vehicles or the like is rapidly increasing, studies on increasing the energy density of secondary batteries have been in progress in order to, for example, improve the degree of freedom when the secondary batteries are mounted in limited spaces in vehicles or the like and extend a cruising distance that can be traveled on a single charge. On the other hand, the safety of secondary batteries tends to conflict with the energy density, and the safety thereof tends to decrease as secondary batteries have an increasing energy density. For example, in secondary batteries mounted in electric vehicles having a cruising distance of several hundreds of kilometers, in a case where secondary batteries become damaged due to overcharging, internal short circuits, or the like, the battery surface temperature may exceed several hundreds of degrees Celsius and sometimes come close to 1000° C.

Since secondary batteries used as power sources of vehicles are usually used as assembled batteries including a plurality of unit batteries, in a case where one unit battery constituting an assembled battery is damaged and reaches the above-described temperature range, there is a concern that adjacent unit batteries will be damaged due to the heat generation and the damage will spread over the entire assembled battery in a chain reaction. In order to prevent such a chain of damage between unit batteries, various techniques have been proposed in which a partition member is provided between unit batteries to cool damaged unit batteries.

For example, PTL 1 discloses a sheet-shaped cooling unit including: a cooling container which is a bag body and disposed at a position near the main surface of batteries; and a cooling liquid stored in the container. If the batteries heat up abnormally, a part of the cooling container is cleaved, and the cooling liquid can be released and spread on the main surfaces of the batteries to cool the batteries. However, there is a problem in that, in a case where the sheet forming the bag body disclosed in PTL 1 is used, water inside permeates from a joint portion on the periphery of the sheet as the elapsed time becomes longer, whereby a sufficient cooling effect is unlikely to be obtained at the time of abnormal heat generation of the batteries.

In addition, PTL 2 discloses a cooling unit which is provided between unit batteries and in which a sheet-shaped member is formed so as to be folded back, the periphery of portions overlapping each other is sealed by the folding back, and a coolant such as water is accommodated in the sealed space. At the time of abnormal heat generation of unit batteries, the coolant can be released from an unsealed portion provided in the sealing portion on the periphery to cool the unit batteries abnormally generating heat. However, in the sheet-shaped member disclosed in PTL 2, the barrier properties of the coolant in the thickness direction of the sheet-shaped member are insufficient. Therefore, there is a problem in that the coolant inside gradually leaks from a portion other than the folded sealing portion on the periphery with the elapse of time and a sufficient cooling effect at the time of abnormal heat generation of the batteries is unlikely to be obtained.

[PTL 1] Japanese Patent Application Publication No. 2013-131428
[PTL 2] WO 2012/032697

SUMMARY

The present inventors have examined a partition member which is disposed between unit batteries and a unit battery and a member other than a unit battery and in which a liquid is accommodated and can be used as a heat transfer medium to move heat from the unit batteries to a desired path. Such a partition member has a configuration in which a liquid is accommodated in a sealed internal space formed through joining of sheet-shaped members as an exterior body. However, such a sealed state is released when a portion where the joint state is released due to deterioration over time or the like is created. The liquid in the internal space is released from the portion where the sealed state is released to outside. If the amount of liquid as a heat transfer medium decreases, suitable heat transfer performance of the partition member deteriorates. For this reason, it is desirable that the amount of liquid accommodated in the partition member be maintained over a long period of time unless a portion is opened at a predetermined temperature due to abnormal heat generation of unit batteries. However, in the above-described related art, long-term storage of a liquid accommodated in an exterior body has not been sufficiently studied.

With the foregoing in view, it is an object of the present invention to provide, even in a case of long-term use, a partition member and an assembled battery in which reduction in the amount of liquid accommodated in the partition member can be inhibited and deterioration in heat transfer performance can be prevented.

The present inventors have conducted extensive studies in order to solve the above-described problems, and as a result, they have found that the above-described problems can be solved by appropriately setting a relation between a structure of an exterior body and the amount of a liquid accommodated therein in a partition member configured such that the liquid is accommodated in the exterior body, thus leading to realization of the present invention. That is, the present invention is as follows.

[1] A partition member having a thickness direction and a surface direction orthogonal to the thickness direction and partitioning between unit batteries constituting an assembled battery in the thickness direction or between a unit battery constituting the assembled battery and a member other than the unit battery, the partition member including: an exterior body including at least sealant resin layers and base material layers; and a liquid accommodated in the exterior body, in which the exterior body has a sealing portion in which the sealant resin layers are overlapped and joined in a region including an outer edge thereof, and a width W (mm) of the sealing portion, a circumferential length L (mm) of the sealing portion, an average interval D (mm) between the two base material layers facing each other in the sealing portion, and a weight A (g) of the liquid satisfy in Equation 1 below.

$$(L \times D)/(W \times A) \leq 10.0 \qquad \text{Equation 1:}$$

[2] The partition member according to [1], in which the width W (mm), the average interval D (mm), and the weight A (g) satisfy Equation 2 below.

$$A \times D \times W \geq 0.50 \qquad \text{Equation 2:}$$

[3] The partition member according to [1] or [2], in which the average interval D (mm) satisfies Equation 3 below.

$$1/D \geq 6.0 \qquad \text{Equation 3:}$$

[4] The partition member according to any one of [1] to [3], including: an encapsulated body which is accommodated in the exterior body and capable of holding the liquid.

[5] The partition member according to [4], in which the encapsulated body is made of a material containing a porous body.

[6] The partition member according to [5], in which the porous body contains at least one of fibers and particles.

[7] The partition member according to any one of [1] to [6], in which the base material layers are metal foils.

[8] The partition member according to [7], in which the metal foils are at least one selected from aluminum foil, copper foil, tin foil, nickel foil, stainless steel foil, lead foil, tin-lead alloy foil, bronze foil, silver foil, iridium foil, and phosphor bronze foil.

[9] The partition member according to any one of [1] to [8], in which the sealant resin layers contain unstretched polypropylene.

[10] The partition member according to any one of [1] to [9], in which the partition member has a structure where the sealant resin layers and the base material layers are stacked, and the base material layers have a lower water vapor permeability value than that of the sealant resin layers.

[11] The partition member according to [10], in which the water vapor permeability of the sealant resin layers is 1 to 50 $g/m^2/day$ and the water vapor permeability of the base material layers is $1 \times 10^{-6}$ to $1 \times 10^{-2}$ $g/m^2/day$.

[12] An assembled battery including: the partition member according to any one of [1] to [11].

Advantageous Effects of Invention

According to the partition member and the assembled battery of the present invention, even in a case of long-term use, it is possible to suppress reduction in the amount of liquid accommodated in the partition member and prevent deterioration in heat transfer performance.

DESCRIPTION OF EMBODIMENTS

Hereinafter, the present invention will be described in detail. The description below is an example (representative example) of an embodiment of the present invention, and the present invention is not limited to the details thereof as long as the present invention does not exceed the gist thereof.

A partition member of the present invention is a partition member having a thickness direction and a surface direction orthogonal to the thickness direction and partitioning between unit batteries constituting an assembled battery in the thickness direction or between a unit battery constituting the assembled battery and a member other than the unit battery, the partition member including: an exterior body including at least sealant resin layers and base material layers; and a liquid accommodated in the exterior body, in which the exterior body has a sealing portion in which the sealant resin layers are overlapped and joined in a region including an outer edge thereof, and a width W (mm) of the sealing portion, a circumferential length L (mm) of the sealing portion, an average interval D (mm) between the two base material layers facing each other in the sealing portion, and a weight A (g) of the liquid satisfy Equation 1 below.

$$(L \times D)/(W \times A) \leq 10.0 \qquad \text{Equation 1:}$$

The above-described "member other than the unit battery" is, for example, a case which has a bottom surface and four side surfaces and in which a partition member and unit batteries constituting an assembled battery are accommodated. The sealing portion is a portion in which sealant resin layers are overlapped and joined in a region (peripheral portion) including an outer edge through thermal fusion, adhesion, or the like. The width W of the sealing portion is a length of the sealing portion orthogonal to the peripheral portion in the surface direction. The average interval D between the two base material layers facing each other in the sealing portion is an average value of the intervals (lengths in the thickness direction) between the base material layers. The average value of the intervals between the base material layers is calculated as an average value of the thicknesses at a plurality of points measured at predetermined intervals. In the present invention, the "outer edge" in the exterior body is an outer edge when the partition member is viewed in the thickness direction, and is used separately from a portion not coming into contact with the sealing portion.

In addition, in the exterior body, it is preferable that the sealant resin layers and the base material layers have a stacked structure and the base material layers have a lower water vapor permeability than that of the sealant resin layers. With such a partition member, release of a liquid accommodated in the partition member is suppressed by the base material layers stacked on the sealant resin layers. In the case where the sealant resin layers and the base material layers in the exterior body have a stacked structure, the average interval D between the two base material layers facing each other in the sealing portion is calculated as an average value of the distances between the base material layers at a plurality of points of the peripheral portion.

In addition, the partition member may further include an encapsulated body which is accommodated in the internal space and capable of holding a liquid. When the partition member accommodates the encapsulated body holding a liquid in the internal space of the exterior body, the pressure resistance against external pressure due to expansion of unit batteries can be improved. In addition, since the partition member holds a liquid in the encapsulated body accommodated in the internal space of the exterior body, deviation of a liquid distribution in the internal space of the exterior body can be inhibited.

Equation 1 above is expressed by combining the structure of the partition member, control factors of the amount of water vapor permeation, and a control factor of a heat transfer function. The control factors of the amount of water vapor permeation in the structure of the partition member include the cross-sectional area of the sealant resin layers in the thickness direction of the partition member and the width of the sealing portion of the sealant resin layers. From the viewpoint of the amount of water vapor permeation, the larger the cross-sectional area (L×D) of the sealant resin layers in the thickness direction of the partition member, the larger the amount of moisture permeation, and the shorter the width (W) of the sealing portion of the sealant resin layers, the larger the amount of moisture permeation. Therefore, by reducing the range of (L×D)/W, a liquid inside the partition member can be held over a long period of time. In addition, from the viewpoint of the heat transfer function, a sufficient heat transfer functions cannot be obtained unless the weight (A) of a liquid inside the partition member is a certain level or higher. That is, the smaller the weight of a liquid, the more disadvantageous it is due to the heat transfer function. Therefore, Equation 1 is obtained by combining the structure of the partition member, control factors of the amount of water vapor permeation, and a control factor of a heat transfer function. By satisfying Equation 1, the decrease in moisture during long-term use of the partition member of the present invention is suppressed and a sufficient heat transfer function is obtained. In this respect, the value of "(L×D)/(W×A)" is preferably 10.0 or less, more preferably 5.0 or less, and still more preferably 3.0 or less. The lower limit of the value of "(L×D)/(W×A)" is not particularly limited, but is usually 0.3 or more. The weight (A) of a liquid inside a partition member can be regarded to be consistent with the difference between weights before and after unsealing when an object including a partition member is partially or completely unsealed so that the inside of the object is ventilated from outside and the object is allowed to stand in an environment of 200° C. for 3 hours.

In addition, it is preferable that the partition member of the present invention satisfy Equation 2 with respect to the width W (mm), the average interval D (mm), and the weight A (g) from the viewpoint of suppressing the amount of water vapor permeation. In addition, satisfying Equation 2 is also preferable in view of improving the above-described heat transfer function of the partition member. Accordingly, satisfying Equation 2 means that the cross-sectional area of the sealant resin layers of the partition member and the heat transfer function are made compatible with each other. For this reason, the value of "A×D×W" in Equation 2 is more preferably 0.60 or more, still more preferably 0.80 or more, and particularly preferably 1.00 or more. The upper limit of the value of "A×D×W" is not particularly limited, but is usually 10.0 or less.

$$A \times D \times W \geq 0.50 \qquad \text{Equation 2:}$$

It is preferable that the partition member of the present invention satisfy Equation 3 with respect to the average interval D (mm) from the viewpoint of further suppressing the amount of water vapor permeation. By satisfying Equation 3, the smaller the cross-sectional area of the sealant resin layers, the longer the liquid inside the partition member can be held. For this reason, the value of "1/D" in Equation 3 is more preferably 8.0 or more, still more preferably 10.0 or more, and particularly preferably 15.0 or more. The upper limit of the value of "1/D" is not particularly limited, but is usually 30.0 or less.

$$1/D \geq 6.0 \qquad \text{Equation 3:}$$

Partition Member

Figure 1A:
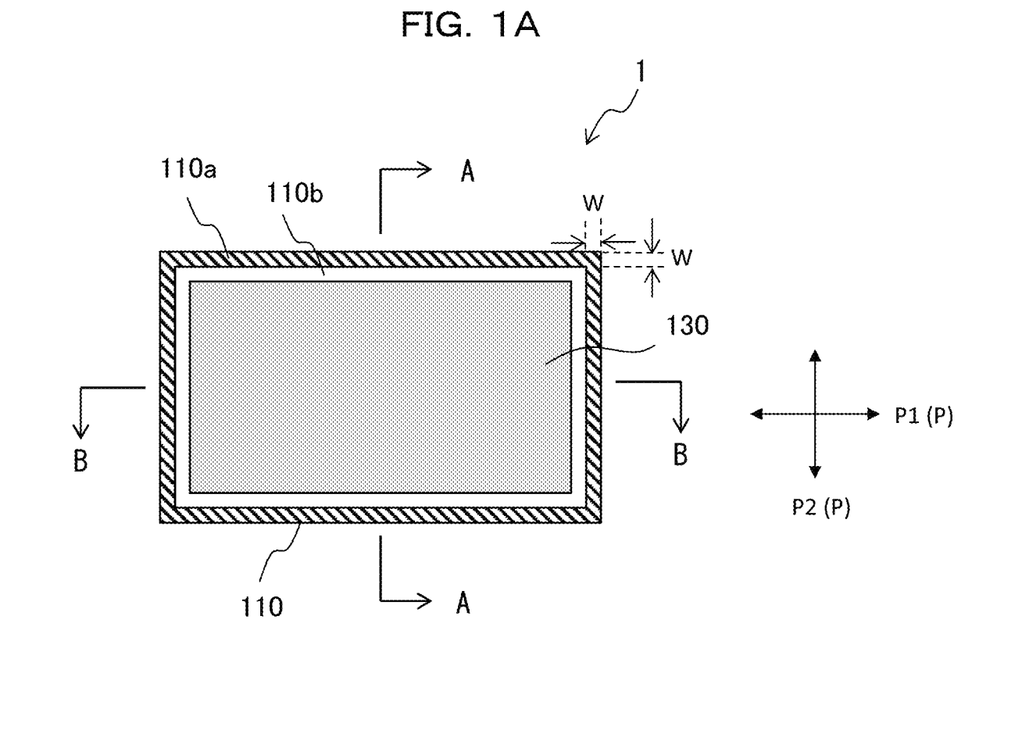
FIG. 1A is a front view showing a first configuration example of a partition member according to an embodiment.
Figure 1B:
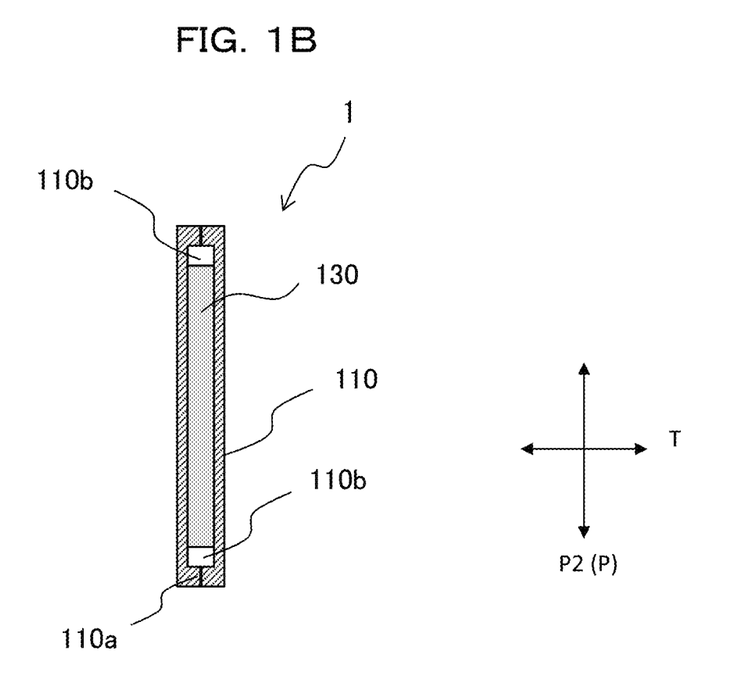
FIG. 1B is a view showing an end surface in a case where the partition member shown in FIG. 1A is cut along line A-A.

FIG. 1A is a front view showing a first configuration example of a partition member of the present invention. FIG. 1B is a view showing an end surface in a case where the partition member shown in FIG. 1A is cut along line A-A. The outer shape of a partition member 1 is formed in, for example, a thick flat plate shape or a sheet shape.

In the examples shown in FIGS. 1A and 1B, the partition member 1 is formed in a flat plate shape having a height, a width, and a thickness and has a thickness direction T and a surface direction P. The surface direction P is a direction orthogonal to the thickness direction T. As long as the surface direction P is orthogonal to the thickness direction T, the surface direction P includes a height direction P2, a width direction P1, and an oblique direction of the partition member 1.

The partition member 1 is used for partitioning between unit batteries constituting an assembled battery in the thickness direction T thereof or between a unit battery constituting the assembled battery and a member other than the unit battery.

Exterior Body

As a sheet-shaped member forming the exterior body 110, a resin sheet, a resin film, and a barrier film having a sealant resin layer can be applied, for example. In the exterior body 110, for example, sealant resin layers which are a sheet-shaped or film-shaped member folded into two or two members thereof can be overlapped, three sides of a peripheral portion 110a can be joined, a liquid can be poured in, and then an unjoined portion can be joined and sealed to accommodate the liquid.

In the partition member 1 of the present invention, the exterior body 110 accommodates a liquid in its internal space. For example, an encapsulated body 130 is sandwiched between resin sheets, resin films, or barrier films having a sealant resin layer folded into two or two sealant resin layers, the peripheral portion 110a of the exterior body 110 into which the two sealant resin layers come into contact is joined by being thermally fused or adhered to form a sealing portion, and a liquid is encapsulated. A liquid may be held, for example, in a cavity of a porous body forming the encapsulated body 130 described below. By pouring a liquid into the encapsulated body 130 or immersing the encapsulated body 130 in the liquid, the encapsulated body 130 can be impregnated with the liquid and hold the liquid.

In addition, although it is preferable that the exterior body 110 have flexibility and can be deformed in response to external pressure such as expansion, contraction, or the like of unit batteries, the exterior body may not have flexibility.

A resin or a metal base material can be used for the exterior body 110, for example. It is preferable to apply a laminate in which a base material and a resin are laminated via an adhesive layer on the exterior body 110 from the viewpoints of flexibility, heat resistance, and strength. A laminate body of three or more layers including a protective resin layer, a metal layer, and a sealant resin layer is preferable as the laminate body of a base material and a resin.

Examples of metal layers include aluminum foil, copper foil, tin foil, nickel foil, stainless steel foil, lead foil, tin-lead alloy foil, bronze foil, iridium foil, and phosphor bronze foil. In particular, aluminum foil, copper foil, and nickel foil are preferable from the viewpoints of processability and availability of materials, and aluminum foil is more preferable from the viewpoints of low density and easy handling.

The water vapor permeability of a metal layer in an environment of 40° C. and 90% RH is not limited, but is preferably $1\times10^{-3}$ g/m²/day or less, more preferably $1\times10^{-4}$ g/m²/day or less, still more preferably $1\times10^{-5}$ g/m²/day or less, and particularly preferably $1\times10^{-6}$ g/m²/day or less. The lower the water vapor permeability of a metal layer, the more the water vapor permeation in the surface direction of an exterior body can be suppressed. Therefore, the heat transfer performance of a partition member can be maintained over a longer period of time. The lower limit of the water vapor permeability of a metal layer is not particularly limited, but is usually $1\times10^{-6}$ g/m²/day or more. If the water vapor permeability thereof exceeds the above-described range, there is a concern that pinholes may be included in a metal layer, and water vapor will be likely to permeate locally therethrough in the surface direction.

The thickness of the metal layer is not particularly limited, but is preferably 5 μm or more, more preferably 8 μm or more, and still more preferably 12 μm or more from the viewpoints of securing water vapor permeability and suppressing generation of pinholes, and is preferably 50 μm or less, more preferably 35 μm or less, and still more preferably 20 μm or less from the viewpoint of securing flexibility.

The protective resin layer is not particularly limited, but examples thereof include: polyolefin resins such as homo- or copolymers of ethylene, propylene and butene; amorphous polyolefin resins such as cyclic polyolefins; polyester resins such as polyethylene terephthalate (PET) and polyethylene naphthalate (PEN); polyamide resins such as nylon 6, nylon 66, nylon 12, and copolymer nylon; ethylene-vinyl acetate copolymer partial hydrolysates (EVOH); polyimide resins; polyetherimide resins; polysulfone resins; polyethersulfone resins; polyether ether ketone resins; polycarbonate resins; polyvinyl butyral resins; polyarylate resins; fluororesins; acrylic resins; and biodegradable resins. Among these, polyamide resins such as nylon 6 and polyester resins such as polyethylene terephthalate are preferable from the viewpoint of imparting heat resistance and mechanical strength to an exterior body. The protective resin layer may be composed of only one layer or a stacked layer of two or more layers. In addition, in the case of two or more layers, the protective resin layer may be selected from different resin layers or from the same resin layer.

The thickness of a protective resin layer is not particularly limited, but is, from the viewpoint of imparting mechanical strength, preferably 5 μm or more, more preferably 10 μm or more, and still more preferably 15 μm or more. In order to secure the flexibility, the thickness of a protective resin layer is preferably 100 μm or less, more preferably 50 μm or less, and still more preferably 30 μm or less.

At least one of a thermosetting resin and a thermoplastic resin can be used as a sealant resin layer, but a thermoplastic resin is particularly preferably used. Examples of sealant resins include: polyolefin resins such as homo- or copolymers of ethylene, propylene and butene; amorphous polyolefin resins such as cyclic polyolefins; polyester resins such as polyethylene terephthalate (PET) and polyethylene naphthalate (PEN); polyvinyl butyral resins; acrylic resins; and biodegradable resins. Among these, it is preferable to use at least one selected from polyolefin resins such as high pressure low density polyethylene (LDPE), linear low-density polyethylene (LLDPE), or polypropylene resin from the viewpoint of melting characteristics at low temperatures for obtaining a function of releasing a liquid inside an exterior body to outside at the time of abnormal heat generation. Furthermore, it is more preferable to use a unstretched polypropylene resin from the viewpoint of long-term preservation within a temperature range in which a partition member of an assembled battery is usually used and from the viewpoint of versatility.

The water vapor permeability of a sealant resin layer in environments of 40° C. and 90% RH is not limited, but is preferably 100 g/m²/day or less, more preferably 50 g/m²/day or less, and still more preferably 20 g/m²/day or less. The lower the water vapor permeability of a sealant resin layer, the more the release amount of water vapor permeating through the sealant resin layer can be suppressed. Therefore, the heat transfer performance of a partition member can be maintained over a longer period of time. The lower limit of the water vapor permeability of a sealant resin layer is not particularly limited, but is usually 1 g/m²/day or more.

The thickness of a sealant resin layer is not particularly limited, but is, from the viewpoint of securing a sealing property, preferably 10 μm or more, more preferably 20 μm or more, and still more preferably 30 μm or more. In addition, in order to secure the flexibility, the thickness of a sealant resin layer is preferably 120 μm or less, more preferably 100 μm or less, and still more preferably 80 μm or less.

The thickness of the exterior body 110 is not particularly limited, but is, from the viewpoints of mechanical strength and the thickness of each of the above-described layers, preferably 30 μm or more, more preferably 45 μm or more, and still more preferably 65 μm or more. In addition, in order to secure the flexibility, the thickness of the exterior body 110 is preferably 280 μm or less, more preferably 210 μm or less, and still more preferably 150 μm or less.

Liquid

The partition member 1 accommodates a liquid in the internal space of an exterior body. This liquid may be held by the encapsulated body 130 which will be described below and is accommodated in the internal space of the exterior body. Any liquid which has thermal conductivity and can transfer heat generated from unit batteries to nearby unit batteries may be used. Since a liquid having thermal conductivity is accommodated in the partition member 1, when using an assembled battery including a plurality of unit batteries, heat generated from unit batteries can be transferred to nearby unit batteries to appropriately disperse the heat in the assembled battery. In addition, as a liquid, one having a boiling point of 80° C. to 250° C. at normal pressure is preferable and one having a boiling point of 100° C. to 150° C. at normal pressure is more preferable. Water is particularly preferable as the liquid from the viewpoints that water has a large amount of vaporization heat and is generally available.

In addition to water, the liquid preferably includes, for example, at least one selected from the group consisting of water, alcohols, esters, ethers, ketones, hydrocarbons, fluorine compounds, and silicone oils. These can be used alone or as a mixture of two or more thereof.

Examples of alcohols that can be used as liquids include: alcohols containing 3 to 8 carbon atoms such as propanol, isopropanol, butanol, benzyl alcohol, and phenylethyl alcohol; and di- or higher valent alcohols such as alkylene glycol such as ethylene glycol and propylene glycol. These can be used alone or as a mixture of two or more thereof.

Examples of esters that can be used as liquids include alkyl aliphatic carboxylates, alkyl carbonic acid diesters, alkyl oxalic acid diesters, and fatty acid esters of ethylene glycol. Examples of alkyl aliphatic carboxylates include lower alkyl aliphatic carboxylates such as: lower alkyl formates such as methyl formate, n-butyl formate, and isobutyl formate; lower alkyl acetates such as n-propyl acetate, isopropyl acetate, n-butyl acetate, and isobutyl acetate; and lower alkyl propionates such as ethyl propionate, n-propyl propionate, isopropyl propionate, n-butyl propionate, and isobutyl propionate. Examples of alkyl carbonic acid diesters include lower alkyl carbonic acid diesters such as dimethyl carbonate, diethyl carbonate, dibutyl carbonate, and methyl ethyl carbonate. Examples of alkyl oxalic acid diesters include lower alkyl oxalic acid diesters such as dimethyl oxalate and diethyl oxalate. Examples of ethylene glycol acetates include propyl acetate and butyl acetate. Examples of fatty acid esters of ethylene glycol include ethylene glycol acetates. These can be used alone or as a mixture of two or more thereof.

Examples of ethers that can be used as liquids include n-butyl ether, n-propyl ether, and isoamyl ether. These can be used alone or as a mixture of two or more thereof.

Examples of ketones that can be used as liquids include ethyl methyl ketone and diethyl ketone. These can be used alone or as a mixture of two or more thereof.

Examples of hydrocarbons that can be used as liquids include heptane, octane, nonane, decane, toluene, and xylene. These can be used alone or as a mixture of two or more thereof.

Examples of fluorine compounds that can be used as liquids include 1,1,2,2,3,3,4-heptafluorocyclopentane (HFC-c447ef) which is a refrigerant, and 1,1,1,2,2,3,3,4,4,5,5,6,6-tridecafluorooctane (HFC-76-13sf). These can be used alone or as a mixture of two or more thereof.

Examples of silicone oils that can be used as liquids include methylpolysiloxane, methylphenylpolysiloxane, cyclic methylsiloxane, and modified silicone oils such as silicone polyether copolymers. These can be used alone or as a mixture of two or more thereof.

In addition, a liquid may contain an antifreeze agent, a preservative, and a pH adjuster. These can be used alone or as a mixture of two or more thereof. A liquid may contain additives such as a substance (antifreeze agent) for imparting antifreeze properties, a preservative, and a pH adjuster. What is contained in a liquid is not limited thereto, and any can be added as necessary.

Encapsulating Body

The partition member 1 of the present invention may include the encapsulated body 130. In the case where the partition member 1 of the present invention includes the encapsulated body 130, the encapsulated body 130 is accommodated in the exterior body 110 and holds a liquid accommodated in the exterior body 110. In the example shown in FIG. 1A, the encapsulated body 130 is formed in a flat plate shape or a sheet shape. The encapsulated body 130 is accommodated in the exterior body 110 with a flat plate shape or a sheet shape and is sealed at the peripheral portion 110*a* including an outer edge of the exterior body 110. The peripheral portion 110*a* including an outer edge is a "region including an outer edge". A fluid such as a liquid or a gas produced by evaporation of a liquid may be present in a gap 110*b* between the internal space of the exterior body 110 and the encapsulated body 130. In a case where no fluid exists in the gap 110*b*, inner surfaces of sheet-shaped members forming the exterior body 110 may be brought into contact with each other.

The encapsulated body 130 is made of, for example, a material containing a porous body. The encapsulated body 130 preferably has properties of being highly heat insulating, and the thermal conductivity of the encapsulated body 130 at 150° C. is, from the viewpoint of suppressing heat transfer through the partition member after a liquid accommodated in the exterior body is released, preferably 0.25 W/(m·K) or less, more preferably 0.20 W/(m·K) or less, and still more preferably 0.15 W/(m·K) or less. The porous body preferably contains at least one of fibers and particles. It is preferable that the porous body contain, as main components, at least one of fibers and particles, it is more preferable that 50 mass % or more of the porous body be at least one of fibers and particles, and it is still more preferable that 90 mass % or more of the porous body be at least one of fibers and particles. At least one selected from the group consisting of, for example, paper, cotton sheets, polyimide fibers, aramid fibers, polytetrafluoroethylene (PTFE) fibers, glass fibers, rock wool, ceramic fibers, and biosoluble inorganic fibers is preferable for a porous body containing fibers. In addition, at least one selected from the group consisting of, for example, silica particles, alumina particles, calcium silicate, clay minerals, vermiculite, micas, cement, perlite, fumed silica, and aerogels is preferable for a porous body containing particles. Among the types of calcium silicate, xonotlite, tobermorite, wollastonite, and gyrolite are preferable and gyrolite is particularly preferable. Clay minerals are mainly magnesium silicate, montmorillonite, and kaolinite. The encapsulated body 130 is preferably obtained by molding a porous body containing at least one of fibers and particles into a sheet shape, and the thickness of the encapsulated body is preferably 0.3 mm or more and more preferably 0.5 mm or more from the viewpoint of suppressing heat transfer through the partition member after a liquid accommodated in the exterior body is released, and is preferably 3.0 mm or less and more preferably 2.5 mm or less from the viewpoint of easy shaping of the partition member.

Assembled Battery

Next, the assembled battery to which the partition member 1 is applied will be described. Assembled batteries are applied to battery packs mounted on, for example, electric vehicles (EV), hybrid electric vehicles (HEV), plug-in hybrid electric vehicles (PHEV), electric heavy equipment, electric motorcycles, electric assisted electric assisted bicycles, ships, aircraft, trains, uninterruptible power supply (UPS), household power storage systems, storage battery systems for power system stabilization using renewable energy from wind, sunlight, tides, ground heat, and the like. However, assembled batteries can also be used as power sources for supplying power to devices other than EVs described above.

Unit Batteries

Figure 2A:
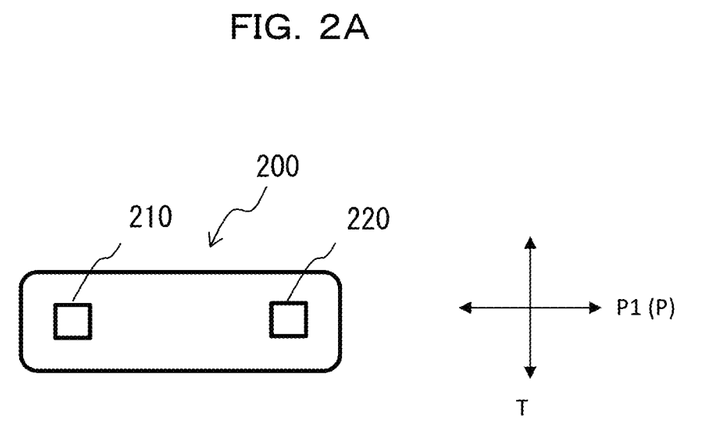
FIG. 2A is a plan view showing an example of a unit battery constituting an assembled battery.
Figure 2B:
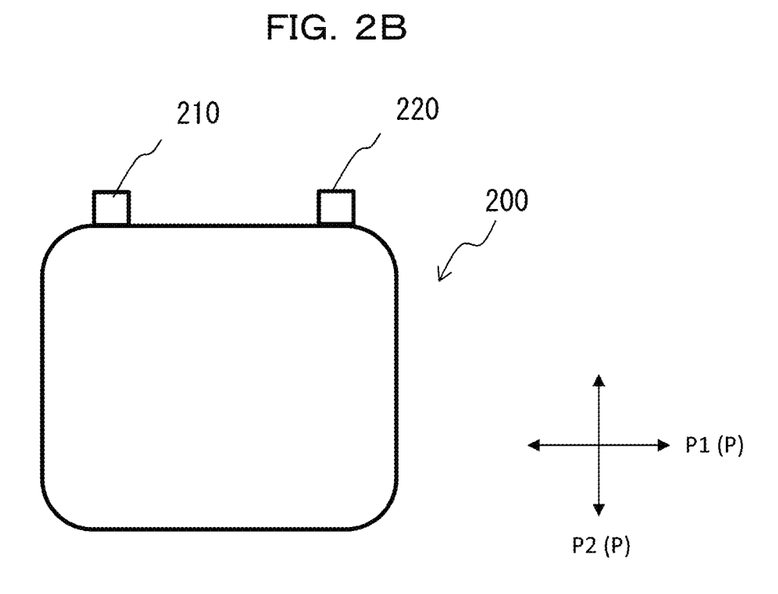
FIG. 2B is a front view showing an example of a unit battery constituting an assembled battery.
Figure 2C:
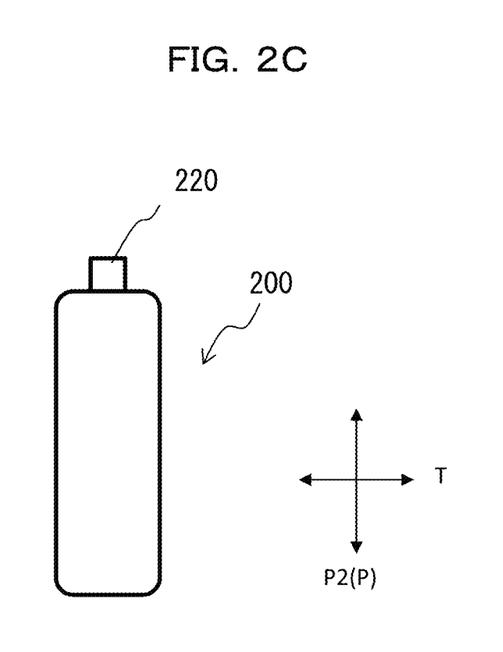
FIG. 2C is a side view showing an example of a unit battery constituting an assembled battery.

FIG. 2A is a plan view showing an example of a unit battery constituting an assembled battery, FIG. 2B is a front view showing an example of a unit battery constituting an assembled battery, and FIG. 2C is a side view showing an example of a unit battery.

A unit battery 200 has a rectangular parallelepiped shape having a length (thickness), width, and a height, and terminals 210 and 220 are provided on the upper surface thereof. The unit battery 200 is, for example, a lithium ion secondary battery including an electrolyte and a positive electrode and a negative electrode capable of storing and releasing lithium ions. Secondary batteries such as a lithium-ion all-solid-state battery, a nickel-hydride battery, a nickel-cadmium battery, and a lead storage battery can be applied in addition to a lithium ion secondary battery.

Assembled Battery

Figure 3:
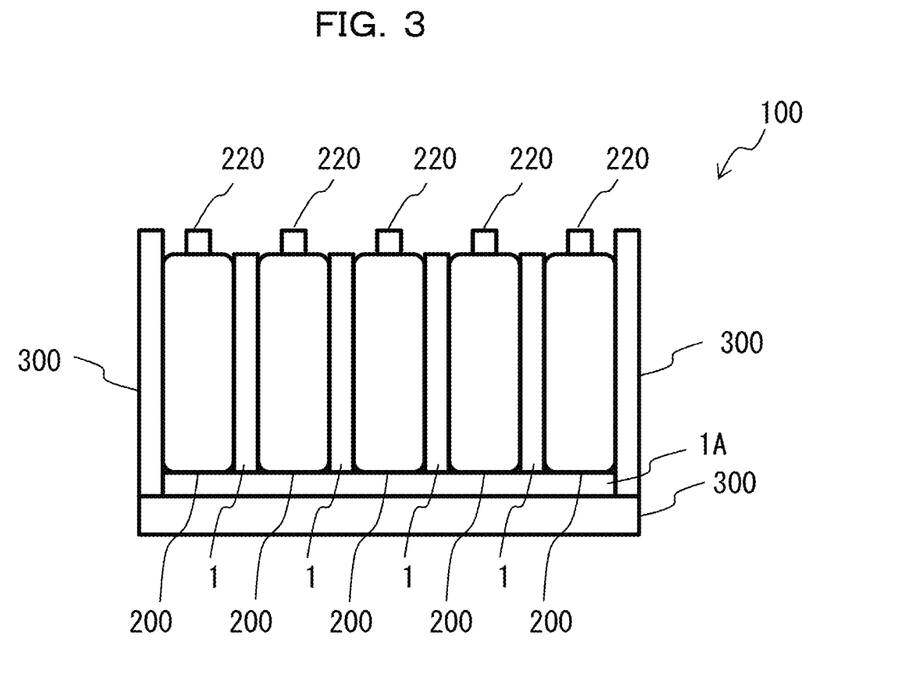
FIG. 3 is a view showing an end surface in a case where an assembled battery formed using a plurality of unit batteries is cut at a plane in a height direction passing through terminals of the unit batteries.

FIG. 3 is a view showing an end surface in a case where an assembled battery formed using a plurality of unit batteries is cut at a plane in a height direction P2 passing through terminals of the unit batteries. An assembled battery 100 accommodates a plurality of unit batteries 200 in a case 300 having a bottom surface and four side surfaces. The above-described partition member 1 is disposed between unit batteries 200, and the adjacent unit batteries 200 are partitioned in the thickness direction T of the partition member 1. A positive electrode terminal (for example, a terminal 210) and a negative electrode terminal (for example, a terminal 220) of the adjacent unit batteries 200 are electrically connected in series by a bus bar (not shown), so that the assembled battery 100 outputs predetermined electric power. As shown in FIG. 3, in the assembled battery 100, a partition member 1A having the same configuration as that of the partition member 1 may be disposed between the bottom surface of the case 300 and the unit batteries 200.

Permeation of Liquid from Exterior Body

Figure 4:
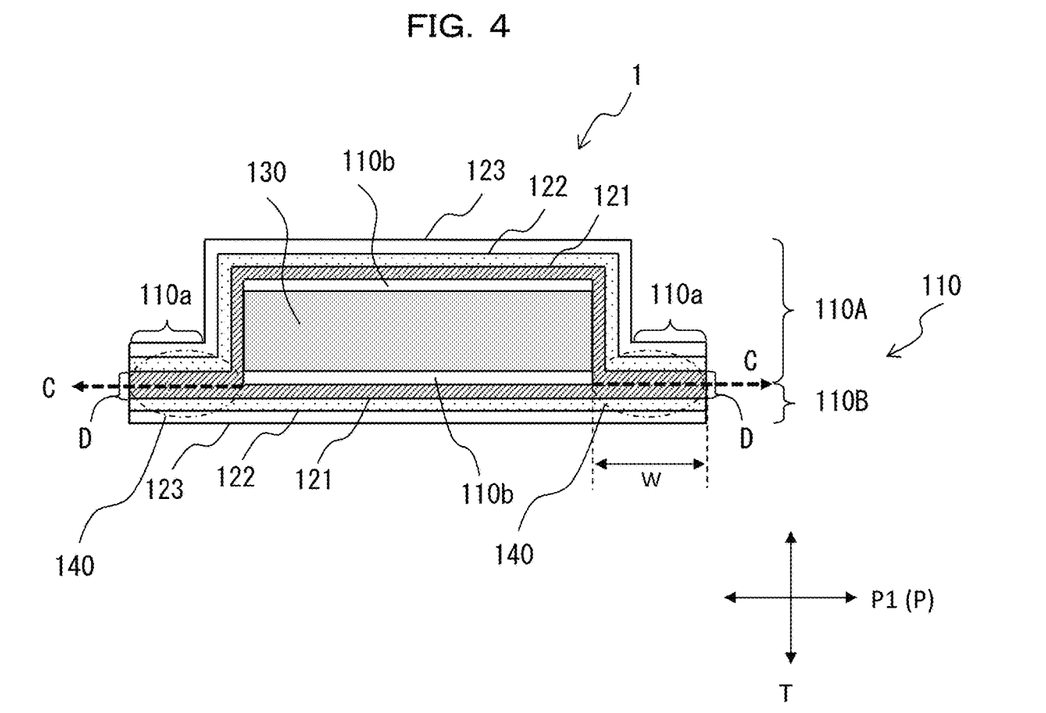
FIG. 4 is a view illustrating permeation of a liquid accommodated in a partition member from a sealant resin layer.

FIG. 4 is a view illustrating permeation of a liquid accommodated in a partition member 1 from a sealant resin layer. FIG. 4 is an end surface in a case where the partition member shown in FIG. 1A is cut along line B-B. Sheet-shaped members 110A and 110B are formed such that sealant resin layers 121, base material layers 122, and protective resin layers 123 are stacked. The sealant resin layers 121 are layers for joining the sheet-shaped member 110A to the sheet-shaped member 110B through thermal fusion or the like, and the above-described resins such as LDPE, LLDPE, and polypropylene are used. The base material layers 122 have a lower water vapor permeability than that of the resin layers, and metals such as aluminum foil exemplified as the above-described metal layers is used. The protective resin layers 123 are layers for protecting the partition member and improving the heat resistance and the strength, and polyamide resins such as nylon 6 and polyester resins such as polyethylene terephthalate exemplified as the above-described protective resin layers are used.

The sealant resin layer 121 of the sheet-shaped member 110A and the sealant resin layer 121 of the sheet-shaped member 110B are piled up so as to come into contact with each other and joined in the peripheral portions 110a to form sealing portions 140 (refer to the inside of circles with alternate long and short dash lines of FIG. 4). In FIG. 4, a sealing portion 140 has a sealing-portion width W in the width direction P1. In the sealing portion 140 in which the peripheral portion 110a is joined, the base material layer 122 of the sheet-shaped member 110A and the base material layers 122 of the sheet-shaped member 110B face each other with the two resin layers 121 sandwiched therein. In the example of FIG. 4, the exterior body 110 accommodates the encapsulated body 130. At this time, a liquid may be present in the gap 110b formed between the encapsulated body 130 and the internal space of the exterior body 110, or the total amount of liquid may be substantially held in the encapsulated body 130 so that there is no liquid in the gap 110b. On the other hand, in a case where the partition member 1 does not include the encapsulated body 130, a liquid may be present in the hollow internal space of the exterior body 110.

A liquid held in the encapsulated body 130 or a liquid present in the gap 110b permeates through the joined sealant resin layers 121 (dotted arrow C) and is released outside. The larger the thickness D of the joined sealant resin layers 121 of the sheet-shaped member 110A and the sheet-shaped member 110B, the more the release of a liquid is promoted and the smaller the amount of liquid accommodated in the exterior body 110. Here, the thickness of the joined sealant resin layers is regarded as an average interval D between the two base material layers. End portions of the joined sealant resin layers are thermally fused. The average interval D between the two base material layers in the thermally fused portion may satisfy Equations 1 to 3, or the average interval D between the two base material layers in a portion which has not been thermally fused may satisfy Equations 1 to 3. In addition, the smaller the sealing-portion width W, the higher the speed of a liquid permeating through the sealant resin layers, the more the release of a liquid is promoted, and the smaller the amount of a liquid accommodated in the exterior body 110.

Deterioration in Performance Due to Reduction in Amount of Liquid

Figure 5:
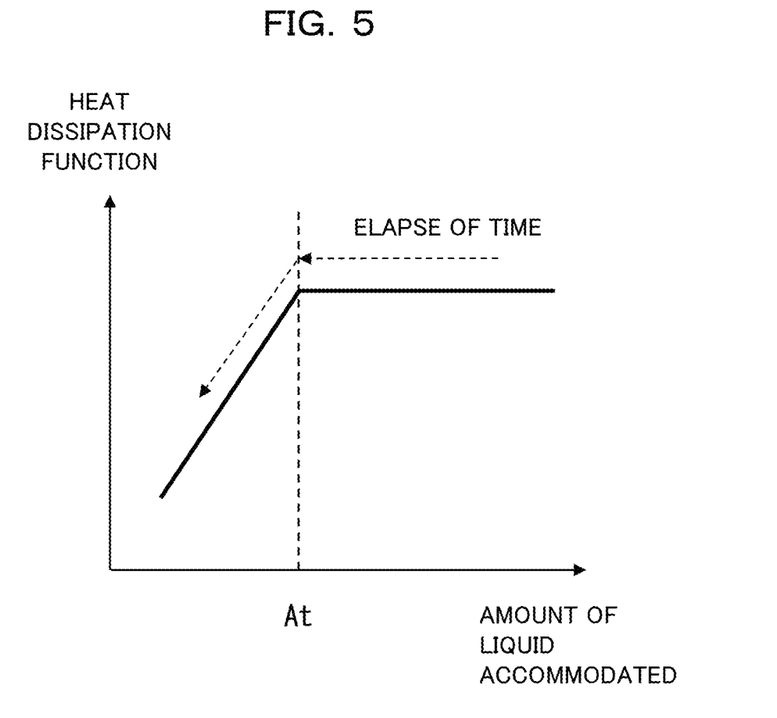
FIG. 5 is a graph showing change in thermal characteristics with respect to the amount of liquid accommodated in a partition member.

FIG. 5 is a graph showing change in thermal characteristics with respect to the amount of liquid accommodated in a partition member. The longitudinal axis is the function (thermal characteristics) of the partition member 1, and the horizontal axis is an amount A of liquid accommodated in the partition member 1 (exterior body 110). The amount A of liquid (weight of the liquid) accommodated in the exterior body 110 decreases with the elapse of time. If the amount of liquid decreases to At, the thermal conductivity of the partition member 1 begins to decrease and the heat dissipation function of the partition member 1 deteriorates.

Therefore, if the sealing-portion width W, the average interval D (in the thickness direction T) between the two base material layers facing each other in the sealing portion 140, and the weight A of a liquid accommodated in the exterior body 110 satisfy the relationship of Equation 1, the partition member 1 and the assembled battery 100 in which release of the liquid accommodated in the exterior body 110 can be suppressed and the heat dissipation function of the partition member 1 can be maintained over a longer period of time can be obtained.

EXAMPLES

Next, specific aspects of the present invention will be described in detail with reference to examples, but the present invention is not particularly limited to these examples.

Example 1

Two aluminum laminate films (which have a total thickness of 67 μm and include a biaxially stretched polyethylene terephthalate film (outside) having a thickness of 15 μm as a protective resin layer, an aluminum layer having a thickness of 12 μm and water vapor permeability of $5 \times 10^{-5}$ g/m²/day as a metal layer, a linear low density polyethylene (LLDPE) film (inside) having a thickness of 30 μm and water vapor permeability of 15 g/m²/day as a sealant resin layer, and polyurethane adhesive layers, each having a thickness of 5 μm, between the layers) cut into a rectangle with a length of 100 mm and a width of 160 mm were overlapped as the exterior body 110, and three sides thereof were thermally fused (at a temperature of 120° C. for 3 seconds) with a sealing-portion width of 1 cm. After pouring 9 g of water as a liquid from an unfused portion of the exterior body 110, the unfused portion was sealed by being thermally fused with a sealing-portion width of 1 cm, and the excess outer circumference was cut to produce a partition member (referred to as a partition member (1)) having a length of 90 mm, a width of 150 mm, and a thickness of 2.1 mm. The thickness D of the resin layers 121 joined in the peripheral portions 110a of the exterior body 110 of this partition member (1) is 0.06 mm, the sealing-portion width W of the sealing portions 140 of the peripheral portions 110a is 5 mm. The length of the exterior body 110 is the length of the height direction P2, and the width thereof is the length of the width direction P1.

As shown in Table 1, the partition member (1) of Example 1 has a value of (L×D)/(W×A) in Equation 1 of 0.6, and therefore satisfies the conditions of Equation 1. Furthermore, the partition member (1) thereof has a value of A×D×W of 2.70 and a value of 1/D of 16.7, and therefore satisfies the conditions of Equations 2 and 3.

The moisture reduction rate under restraint of the obtained partition member (1) was evaluated. Iron plates of 120 mm×180 mm×10 mm (thickness) and washers having a thickness of 1 mm were prepared, and the partition member (1) was placed flat on an iron plate. Bolts were passed through holes at four corners of the iron plate which had been opened in advance, and two washers with a thickness of 1 mm were passed through each bolt. Thereafter, bolts were similarly passed through another iron plate having holes at four corners, and a partition member was sandwiched between the iron plates (in a space having a thickness of 2 mm) and restrained to a thickness of 2 mm. Since the partition member having a thickness of 2.1 mm is restrained to a thickness of 2 mm, the partition member is compressed by 5%. The restrained partition member was allowed to stand in an oven at 50° C. while maintaining the state and released from the restraint after 180 days, the weight of the partition member (1) was measured, and the moisture reduction rate was calculated by the following calculation equation. From the calculation result, the moisture reduction rate was less than 1%. The obtained result is shown in Table 1.

(Moisture reduction rate)=[[(weight of partition member at 50° C. before restraint for 180 days)−(weight after restraint)]/(initial injection amount of water)]×100(%)

Example 2

A partition member (referred to as a partition member (2)) of Example 2 was produced through the same operation as in Example 1 except that the thickness D of the sealant resin layers 121 joined in the peripheral portions 110a was 0.10 mm.

The partition member (2) has joined (fused) resin layers thicker than those of the partition member (1) of Example 1 and has a value of (L×D)/(W×A) in Equation 1 of 1.1, and therefore satisfies the conditions of Equation 1. Furthermore, the partition member (2) has a value of A×D×W of 4.50 and a value of 1/D of 10.0, and therefore satisfies the conditions of Equations 2 and 3. In addition, the weight measurement was carried out in the same manner as in Example 1, and the moisture reduction rate was less than 1%. The obtained result is shown in Table 1.

Example 3

A partition member (referred to as a partition member (3)) of Example 3 was produced through the same operation as in Example 1 except that the amount A of liquid accommodated in the exterior body 110 was 4 g. The partition member (3) has a smaller amount A of liquid accommodated in the exterior body 110 than that of the partition member (1) of Example 1 and has a value of (L×D)/(W×A) in Equation 1 of 1.4, and therefore satisfies the conditions of Equation 1. Furthermore, the partition member (3) has a value of A×D×W of 1.20 and a value of 1/D of 16.7, and therefore satisfies the conditions of Equations 2 and 3. In addition, the weight measurement was carried out in the same manner as in Example 1, and the moisture reduction rate was less than 1%. The obtained result is shown in Table 1.

Example 4

A partition member (referred to as a partition member (4)) of Example 4 was produced through the same operation as in Example 1 except that the sealing-portion width W of the peripheral portions 110a was 1.5 mm. The partition member (4) has joined (fused) resins narrower than those of the partition member (1) of Example 1 and has a value of (L×D)/(W×A) in Equation 1 of 2.1, and therefore satisfies the conditions of Equation 1. Furthermore, the partition member (4) has a value of A×D×W of 0.81 and a value of 1/D of 16.7, and therefore satisfies the conditions of Equations 2 and 3. In addition, the weight measurement was carried out in the same manner as in Example 1, and the moisture reduction rate was less than 1%. The obtained result is shown in Table 1.

Example 5

A partition member (referred to as a partition member (5)) of Example 5 was produced through the same operation as in Example 1 except that a porous sheet (vermiculite sheet; thickness of 2 mm) cut into a rectangle with a length of 7 cm and a width of 13 cm was stored as the encapsulated body 130 in the exterior body 110 before a liquid is poured. The partition member (5) has a value of (L×D)/(W×A) in Equation 1 of 1.1, and therefore satisfies the conditions of Equation 1. Furthermore, the partition member (5) has a value of A×D×W of 4.50 and a value of 1/D of 10.0, and therefore satisfies the conditions of Equations 2 and 3. In addition, the weight measurement was carried out in the same manner as in Example 1, and the moisture reduction rate was less than 1%. The obtained result is shown in Table 1.

Comparative Example 1

A partition member (referred to as a partition member (6)) of Comparative Example 1 was produced through the same operation as in Example 1 except that the sealing-portion width W of the peripheral portions 110a was 0.5 mm. The partition member (6) has joined (fused) resins narrower than those of the partition member (1) of Example 1 and has a value of (L×D)/(W×A) in Equation 1 of 10.7, and therefore does not satisfy the conditions of Equation 1. Furthermore, the partition member (6) has a value of A×D×W of 0.45, and therefore does not satisfy the conditions of Equation 2. On the other hand, the partition member (6) has a value of 1/D of 10.0, and therefore satisfies the conditions of Equation 3. As a result of carrying out the weight measurement in the same manner as in Example 1, the moisture reduction rate was 1% or more, and reduction in the amount of moisture under restraint at a low temperature was observed. The obtained result is shown in Table 1.

Comparative Example 2

A partition member (referred to as a partition member (7)) of Comparative Example 2 was produced through the same operation as in Example 1 except that the thickness D of the sealant resin layers 121 joined in the peripheral portions 110a was 0.18 mm. The partition member (7) has joined (fused) resin layers significantly thicker than those of the partition member (1) of Example 1 and has a value of (L×D)/(W×A) in Equation 1 of 19.2, and therefore does not satisfy the conditions of Equation 1. On the other hand, the partition member (7) has a value of A×D×W of 0.81, and therefore satisfies the conditions of Equation 2. In addition, the partition member (7) has a value of 1/D of 5.6, and therefore does not satisfy the conditions of Equation 3. As a result of carrying out the weight measurement in the same manner as in Example 1, the moisture reduction rate was 2% or more, and reduction in the amount of moisture under restraint at a low temperature was observed. The obtained result is shown in Table 1.

TABLE 1

| | PARTITION MEMBER | SIZE OF ENCAPSULATED BODY | | | L (mm) *1 | A (g) *2 | D (mm) *3 | W (mm) *4 | L * D/ (W * A) | A * D * W | 1/D | *5 (%) |
| | | LENGTH (cm) | WIDTH (cm) | THICKNESS (mm) | | | | | | | | |
|---|---|---|---|---|---|---|---|---|---|---|---|---|
| EXAMPLE 1 | 1 | — | — | — | 480 | 9 | 0.06 | 5 | 0.6 | 2.70 | 16.7 | 0.2 |
| EXAMPLE 2 | 2 | — | — | — | 480 | 9 | 0.1 | 5 | 1.1 | 4.50 | 10.0 | 0.1 |
| EXAMPLE 3 | 3 | — | — | — | 480 | 4 | 0.06 | 5 | 1.4 | 1.20 | 16.7 | 0.5 |
| EXAMPLE 4 | 4 | — | — | — | 480 | 9 | 0.06 | 1.5 | 2.1 | 0.81 | 16.7 | 0.4 |
| EXAMPLE 5 | 5 | 7 | 13 | 2 | 480 | 9 | 0.1 | 5 | 1.1 | 4.50 | 10.0 | 0.2 |
| COMPARATIVE EXAMPLE 1 | 6 | — | — | — | 480 | 9 | 0.1 | 0.5 | 10.7 | 0.45 | 10.0 | 1.6 |
| COMPARATIVE EXAMPLE 2 | 7 | — | — | — | 480 | 9 | 0.18 | 0.5 | 19.2 | 0.81 | 5.6 | 2.7 |

*1: Circumferential length L (mm) of exterior body
*2: Amount A (g) of liquid
*3: Thickness D (mm) of sealant resin layer
*4: Width W (mm) of sealing portion
*5: Moisture reduction rate (%) at 50° C. after 180 days

Example 6

Two aluminum laminate films (which have a total thickness of 97 μm and include a biaxially stretched polyester film (outside) having a thickness of 15 μm as a protective resin layer, an aluminum layer having a thickness of 12 μm as a metal layer, an unstretched polypropylene (CPP) film (inside) having a thickness of 60 μm and water vapor permeability of 15 g/m²/day as a sealant resin layer, and polyurethane adhesive layers, each having a thickness of 5 μm, between the layers) cut into a rectangle with a length of 100 mm and a width of 160 mm were overlapped as the exterior body 110, and three sides thereof were thermally fused (at a temperature of 150° C. for 3 seconds) with a sealing-portion width of 1 cm. After pouring 5 g of water as a liquid from an unfused portion of the exterior body 110, the unfused portion was sealed by being thermally fused with a sealing-portion width of 1 cm, and the excess outer circumference was cut to produce a partition member (referred to as a partition member (8)) having a length of 90 mm, a width of 150 mm, and a thickness of 1.05 mm. The thickness D of the resin layers 121 joined in the peripheral portions 110a of the exterior body 110 of this partition member (8) is 0.1 mm, the sealing-portion width W of the peripheral portions 110a is 5 mm. The length of the exterior body 110 is the length of the height direction P2, and the width thereof is the length of the width direction P1.

As shown in Table 2, the partition member (8) of Example 6 has a value of (L×D)/(W×A) in Equation 1 of 1.9, and therefore satisfies the conditions of Equation 1. Furthermore, the partition member (8) has a value of A×D×W of 2.5 and a value of 1/D of 10.0, and therefore satisfies the conditions of Equations 2 and 3.

The moisture reduction rate under restraint of the obtained partition member (8) was evaluated. The moisture reduction rate was calculated by the following calculation equation using the same evaluation method as that in Example 1 except that only one washer with a thickness of 1 mm was used (since the partition member having a thickness of 1.05 mm is restrained to a thickness of 1 mm, the partition member is compressed by 5% in the same manner as in Example 1), and the restrained partition member was allowed to stand in an oven at 80° C. and released from the restraint after 4 days. From the calculation result, the moisture reduction rate was less than 1%. The obtained result is shown in Table 2.

(Moisture reduction rate)=[[(weight of partition member at 80° C. before restraint for 4 days)−(weight after restraint)]/(initial injection amount of water)]×100(%)

Example 7

A partition member (referred to as a partition member (9)) of Example 7 was produced through the same operation as in Example 6 except that an LLDPE film having a thickness of 60 μm was used as a sealant resin layer. In the partition member (9), although LLDPE having a lower melting point than that of the partition member (8) of Example 6 is used, the value of (L×D)/(W×A) in Equation 1 is 1.9, and therefore the conditions of Equation 1 are satisfied. Furthermore, the partition member (9) has a value of A×D×W of 2.50 and a value of 1/D of 10.0, and therefore satisfies the conditions of Equations 2 and 3. On the other hand, as a result of carrying out the weight measurement in the same manner as in Example 6, the moisture reduction rate was 24% or more, and reduction in the amount of moisture under restraint at a high temperature was observed. The obtained result is shown in Table 2.

Comparative Example 3

A partition member (referred to as a partition member (10)) of Comparative Example 3 was produced through the same operation as in Example 7 except that the sealing-portion width W of the peripheral portions 110a was 0.5 mm. The partition member (10) has a value of (L×D)/(W×A) in Equation 1 of 19.2 and a value of A×D×W in Equation 2 of 0.25, and therefore satisfies the conditions of Equations 1 and 2. In addition, the partition member (10) has a value of 1/D of 10.0, and therefore satisfies the conditions of Equation 3. On the other hand, it was found that, as a result of carrying out the weight measurement in the same manner as in Example 6, the moisture reduction rate was 90% or more, and therefore encapsulated water could not be held under restraint at a high temperature. The obtained result is shown in Table 2.

As shown in Tables 1 and 2, W (mm), D (mm), and A (g) in the partition members according to the above-described examples satisfy the relationship of Equation 1. By forming a partition member so as to satisfy the relationship of Equation 1, reduction in the amount of moisture can be suppressed. Therefore, a partition member having favorable thermal conductivity can be obtained. In particular, it can be seen from the comparison between Example 6 and Example 7 in Table 2 that the effect of suppressing the reduction in the amount of moisture is particularly excellent in the case where unstretched polypropylene is used in a sealant resin layer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A partition member having a thickness direction and a surface direction orthogonal to the thickness direction and partitioning between unit batteries constituting an assembled battery in the thickness direction or between a unit battery constituting the assembled battery and a member other than the unit battery, the partition member comprising:
   an exterior body including at least sealant resin layers and base material layers; and
   a liquid accommodated in the exterior body, wherein
   the exterior body has a sealing portion in which the sealant resin layers are overlapped and joined in a region including an outer edge thereof, and
   a width W (mm) of the sealing portion, a circumferential length L (mm) of the sealing portion, an average interval D (mm) between the two base material layers facing each other in the sealing portion, and a weight A (g) of the liquid satisfy Equation 1 below $$(L \times D)/(W \times A) \leq 10.0 \qquad \text{Equation 1.}$$

TABLE 2

| | | | SIZE OF ENCAPSULATED BODY | | | L | A | D | W | | | | |
|---|---|---|---|---|---|---|---|---|---|---|---|---|---|
| | PARTITION MEMBER | LAYER | LENGTH (cm) | WIDTH (cm) | THICKNESS (mm) | (mm) *1 | (g) *2 | (mm) *3 | (mm) *4 | L * D/ (W * A) | A * D * W | 1/D | *5 (%) |
| EXAMPLE 6 | 8 | CPP | 7 | 13 | 1.05 | 480 | 5 | 0.1 | 5 | 1.9 | 2.50 | 10.0 | 0.4 |
| EXAMPLE 7 | 9 | LLDPE | 7 | 13 | 1.05 | 480 | 5 | 0.1 | 5 | 1.9 | 2.50 | 10.0 | 24.0 |
| COMPARATIVE EXAMPLE 3 | 10 | LLDPE | 7 | 13 | 1.05 | 480 | 5 | 0.1 | 0.5 | 19.2 | 0.25 | 10.0 | >90 |

*1: Circumferential length L (mm) of exterior body
*2: Amount A (g) of liquid
*3: Thickness 0 (mm) of sealant resin layer
*4: Width W (mm) of sealing portion
*5: Moisture reduction rate (%) at 80° C. after 4 days 2. The partition member according to claim 1, wherein the width W (mm), the average interval D (mm), and the weight A (g) satisfy Equation 2 below $$A \times D \times W \geq 0.50 \qquad \text{Equation 2.}$$

3. The partition member according to claim 1, wherein the average interval D (mm) satisfies in Equation 3 below $$1/D \geq 6.0 \qquad \text{Equation 3.}$$

4. The partition member according to claim 1, further comprising an encapsulated body which is accommodated in the exterior body and capable of holding the liquid.

5. The partition member according to claim 4, wherein the encapsulated body is made of a material containing a porous body.

6. The partition member according to claim 5, wherein the porous body contains at least one of fibers and particles.

7. The partition member according to claim 1, wherein the base material layers are metal foils.

8. The partition member according to claim 7, wherein the metal foils are at least one selected from aluminum foil, copper foil, tin foil, nickel foil, stainless steel foil, lead foil, tin-lead alloy foil, bronze foil, silver foil, iridium foil, and phosphor bronze foil.

9. The partition member according to claim 1, wherein the sealant resin layers contain unstretched polypropylene.

10. The partition member according to claim 1, wherein the partition member has a structure where the sealant resin layers and the base material layers are stacked, and
the base material layers have a lower water vapor permeability value than that of the sealant resin layers.

11. The partition member according to claim 10, wherein the water vapor permeability of the sealant resin layers is 1 to 50 $g/m^2/day$ and the water vapor permeability of the base material layers is $1 \times 10^{-6}$ to $1 \times 10^{-2}$ $g/m^2/day$.

12. An assembled battery comprising:
the partition member according to claim 1.

* * * * *